United States Patent
Chen et al.

(10) Patent No.: US 11,685,698 B2
(45) Date of Patent: Jun. 27, 2023

(54) DEVICE AND METHOD FOR REINFORCING WEATHERED STONE RELICS BY USING LOW TEMPERATURE PLASMA TO ACTIVATE CALCIUM HYDROXIDE IN CARBON DIOXIDE ATMOSPHERE

(71) Applicant: HENAN PROVINCIAL INSTITUTE OF CULTURAL HERITAGE AND ARCHAEOLOGY, Zhengzhou (CN)

(72) Inventors: Jiachang Chen, Zhengzhou (CN); Liangshuai Zhang, Zhengzhou (CN); Siyu He, Zhengzhou (CN); Xiaolin Chen, Zhengzhou (CN); Jing Tang, Zhengzhou (CN); Haitao Yan, Zhengzhou (CN); Xinguang Wang, Zhengzhou (CN); Ming Chi, Zhengzhou (CN); Xinzhan Cui, Zhengzhou (CN); Xin Liu, Zhengzhou (CN)

(73) Assignee: HENAN PROVINCIAL INSTITUTE OF CULTURAL HERITAGE AND ARCHAEOLOGY, Zhengzhou (CN)

( * ) Notice: Subject to any disclaimer, the term of this patent is extended or adjusted under 35 U.S.C. 154(b) by 244 days.

(21) Appl. No.: 17/036,499

(22) Filed: Sep. 29, 2020

(65) Prior Publication Data
US 2021/0179504 A1    Jun. 17, 2021

(51) Int. Cl.
*C04B 41/45* (2006.01)
*C04B 41/50* (2006.01)
*C04B 41/00* (2006.01)

(52) U.S. Cl.
CPC .......... *C04B 41/501* (2013.01); *C04B 41/009* (2013.01); *C04B 41/4558* (2013.01)

(58) Field of Classification Search
CPC .. C04B 41/009; C04B 41/4558; C04B 41/501
See application file for complete search history.

(56) References Cited

FOREIGN PATENT DOCUMENTS

CN          87101333 A    * 11/1988
CN         110790585 A    *  2/2020   ........... C04B 41/009

OTHER PUBLICATIONS

Otero, Jorge, Charola, A. Elena, Grissom, Carol A. and Starinieri, Vincenzo (2017). An overview of nanolime as a consolidation method for calcareous substrates. Ge-conservación, 1 (11), 71-78: (Year: 2017).*

(Continued)

*Primary Examiner* — Nathan H Empie
(74) *Attorney, Agent, or Firm* — Nolte Lackenbach Siegel

(57) ABSTRACT

The invention provides a device and a method for reinforcing weathered stone relics by using low temperature plasma to activate calcium hydroxide in a carbon dioxide atmosphere. Based on the low temperature plasma physics and the principles of the relics conservation, the invention applies the technology of low temperature plasma to relics conservation, and especially to the reinforcement of weathered stone relics by activating calcium hydroxide. According to the application, using low temperature plasma source loaded with carbon dioxide to active calcium hydroxide can realize the carbonation and precipitation of calcium hydroxide within 1 min-2 min, and reinforce the weathered stone relics. The application has the advantages of safety, high efficiency, non-damage, and no side effects.

5 Claims, 5 Drawing Sheets

(56) References Cited

OTHER PUBLICATIONS

Voltolina et al. "Assessment of plasma torches as innovative tool for cleaning of historical stone materials." Journal of Cultural Heritage 22 (2016) 940-950. (Year: 2016).*

* cited by examiner

US 11,685,698 B2

DEVICE AND METHOD FOR REINFORCING WEATHERED STONE RELICS BY USING LOW TEMPERATURE PLASMA TO ACTIVATE CALCIUM HYDROXIDE IN CARBON DIOXIDE ATMOSPHERE

CROSS REFERENCE TO RELATED APPLICATION

This application claims the priority of Chinese Patent Application No. CN201911304132.2, entitled "Device and method for reinforcing weathered stone relics by using low temperature plasma to activate calcium hydroxide in carbon dioxide atmosphere" filed with the China National Intellectual Property Administration on Dec. 17, 2019, which is incorporated herein by reference in its entirety.

TECHNICAL FIELD

The invention relates to the relics conservation, and in particular to a device and a method for reinforcing weathered stone relics by using low temperature plasma to activate calcium hydroxide in carbon dioxide atmosphere.

BACKGROUND ART

At present, the materials for reinforcing weathered stone relics mainly include inorganic materials, organic materials, and organic-inorganic composite materials. Among them, organic materials have better short-term reinforcement effects, such materials, however, will become brittle after aging for a long-term, and will thus have reduced mechanical properties. At the same time, due to the impermeability of the film formed on relics, the surface of the relics will expand, be pulverized, and even fall off. In short, such materials exhibit poor compatibility. In recent years, inorganic materials, especially calcium hydroxide, have been widely studied due to their good compatibility. Calcium hydroxide particles react with carbon dioxide in the air to form calcium carbonate, which is fused with stone relics. However, the traditional method for reinforcing stone relics with calcium hydroxide has the disadvantages of low carbonation speed, low efficiency and the like, so that the method is greatly restricted.

SUMMARY

To solve the above problems, the invention provides a device and a method for reinforcing weathered stone relics by using low temperature plasma to activate calcium hydroxide in carbon dioxide atmosphere.

The object of the invention is achieved by the following scheme: a device for reinforcing weathered stone relics by using low temperature plasma to activate calcium hydroxide in carbon dioxide atmosphere, comprising a low temperature plasma source, which is provided with a nozzle at the front end, and a carbon dioxide container connected by a connecting pipe at the back end, wherein the carbon dioxide container is provided with a pressure gauge.

The carbon dioxide container is a carbon dioxide steel cylinder.

The low temperature plasma source 1 is provided with a power supply connecting line and a grounding line at the back end, wherein the power supply connecting line is connected with a power supply, which is provided with a switch.

The carbon dioxide container is provided with a pressure gauge and a valve at the outlet.

A method for reinforcing weathered stone relics by using low temperature plasma to activate calcium hydroxide in carbon dioxide atmosphere, comprising the following steps:

(1) removing the attachments on the surface of stone relics;

(2) dispersing calcium hydroxide in an isopropanol aqueous solution with a volume concentration of 5%-5.5% to obtain a saturated solution, wherein the calcium hydroxide has a particle size of lower than 6.5 μm;

(3) spraying the reinforcement agent obtained in step (2) on the weathered layer of the stone relics;

(4) spraying the stone relics sprayed with reinforcement agent obtained in step (3) by using the nozzle of a low temperature plasma source loaded with carbon dioxide; and (5) repeating steps (3) and (4) 10-15 times.

It should be understood that conducting steps (3) and (4) once means the reinforcement takes place once, and the interval between two reinforcements is at least 20 minutes.

In step (4), the low temperature plasma source has a working voltage of 110 V-240 V, a frequency of 50 Hz-60 Hz, and a maximum power of 30 W.

In step (4), the low temperature plasma source has a standard treating distance of 2 mm-10 mm, and a standard treating width of 5 mm-20 mm.

In step (4), the plasma generated by the low temperature plasma source is cold plasma with a temperature of lower than 50° C.

In step (4), the site where is sprayed with the reinforcement agent on the stone relics is scanned for 1 min-2 min by using the plasma flame at the nozzle of the low temperature plasma source.

In step (2), the method for preparing the reinforcement agent comprises the following steps: dispersing nano calcium hydroxide or the calcium hydroxide with a particle size of lower than or equal to 6.5 μm from Shanghai Macklin Biochemical Technology Co., Ltd in an isopropanol aqueous solution with a volume concentration of 5%-5.5%, then stirring the system for 2 h-3 h with a magnetic stirrer or concussing the system for 2 h-3 h with ultrasonic waves to obtain a saturated solution.

Beneficial effects: The invention provides a device and a method for reinforcing weathered stone relics by using low temperature plasma to activate calcium hydroxide in carbon dioxide atmosphere. Based on the low temperature plasma physics and the principles of the relics conservation, the invention applies the technology of low temperature plasma to relics conservation, and especially to the reinforcement of weathered stone relics by activating calcium hydroxide.

The abundant high-energy and high-activity particles in the low temperature plasma bombard calcium hydroxide, causing it to be etched and roughened, so as to increase the solubility of the calcium hydroxide surface and provide more active sites, making it easier to react with activated carbon dioxide. This is more conducive to the nucleation and growth of calcium carbonate. The low temperature plasma can active surface energy, and promote the combination of weathered lithofacies and calcium carbonate. Carbon dioxide gas is introduced into the integrated low temperature plasma source, on the one hand, as ionized gas, on the other hand, the activated carbon dioxide gas reacts with the activated calcium hydroxide to promote its orderly "carbonation", and accelerate its transformation into calcite calcium carbonate with reinforcing effect, thereby enhancing the strength and weather resistance of the stone relics.

According to the application, using low temperature plasma source loaded with carbon dioxide to active calcium hydroxide can realize the carbonation and precipitation of calcium hydroxide within 1 min-2 min, and reinforce the weathered stone relics. The application has the advantages of safety, high efficiency, non-damage, and no side effects.

DETAILED DESCRIPTION OF THE EMBODIMENTS

Figure 1:
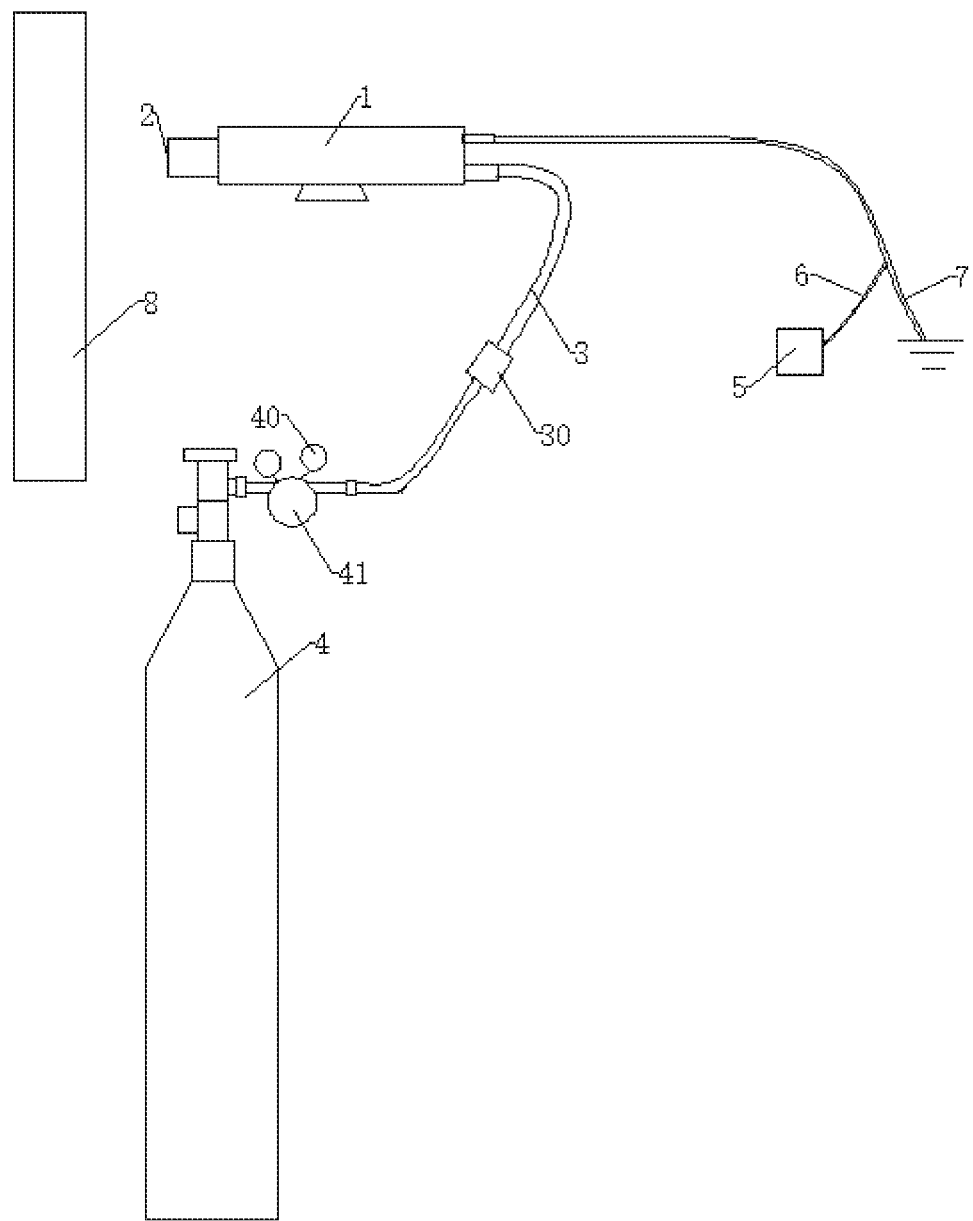
FIG. 1 is a structure schematic diagram of the device according to the application.

As shown in FIG. 1, a device for reinforcing weathered stone relics by using low temperature plasma to activate calcium hydroxide in carbon dioxide atmosphere comprises a low temperature plasma source 1, which is provided with a nozzle 2 at the front end, and a carbon dioxide container 4 connected by a connecting pipe 3 at the back end, and is also provided with a power supply connecting line 6 and a grounding line 7 at the back end, wherein the power supply connecting line 6 is connected with a power supply 5, which is provided with a switch, and the carbon dioxide container 4 is provided with a pressure gauge 40 and a valve 41 at the outlet. In the case of several connecting pipes 3, joints 30 are provided between them.

The carbon dioxide container is a carbon dioxide steel cylinder.

A method for reinforcing weathered stone relics by using low temperature plasma to activate calcium hydroxide in carbon dioxide atmosphere, comprising the following steps:

(1) removing the attachments on the surface of stone relics;

(2) dispersing calcium hydroxide in an isopropanol aqueous solution with a volume concentration of about 5%-5.5% to obtain a saturated solution, wherein the calcium hydroxide has a particle size of lower than 6.5 μm;

(3) spraying the reinforcement agent obtained in step (2) on the weathered layer of the stone relics;

(4) spraying the stone relics 8 sprayed with reinforcement agent obtained in step (3) by using the nozzle of a low temperature plasma source loaded with carbon dioxide;

(5) repeating steps (3) and (4) 10-15 times, and conducting steps (3) and (4) once means that the reinforcement takes place once. The interval between two reinforcements is at least 20 minutes: after each reinforcement, the temperature of stone can be changed by 1° C.; the setting of the interval allows the remaining minuscule amount of calcium hydroxide to react with carbon dioxide in the air, ensuring complete carbonation of calcium hydroxide. Moreover, if a plasma source works continuously for a long time such that the gas from carbon dioxide steel cylinder is continuously released, the interface between the gas pipe and the steel cylinder will be frozen due to the reduced temperature after a long time of about half an hour. In view of this, the interval between reinforcements is set to at least 20 minutes.

In step (4), the low temperature plasma source has a working voltage of 110 V-240 V, a frequency of 50 Hz-60 Hz, and a maximum power of 30 W.

In step (4), the low temperature plasma source has a standard treating distance of 2 mm-10 mm, and a standard treating width of 5 mm-20 mm.

In step (4), the plasma generated by the low temperature plasma source is cold plasma with a temperature of lower than 50° C.

In step (4), the site where is sprayed with the reinforcement agent on the stone relics 8 is scanned for 1 min-2 min by using the plasma flame at the nozzle of the low temperature plasma.

In step (2), the method for preparing the reinforcement agent comprises the following steps: dispersing nano calcium hydroxide or the calcium hydroxide with a particle size of lower than or equal to 6.5 μm from Shanghai Macklin Biochemical Technology Co., Ltd in an isopropanol aqueous solution with a volume concentration of 5%-5.5%, then stirring the system for 2 h-3 h with a magnetic stirrer or concussing the system for 2 h-3 h with ultrasonic waves to obtain a saturated solution.

Figure 2:
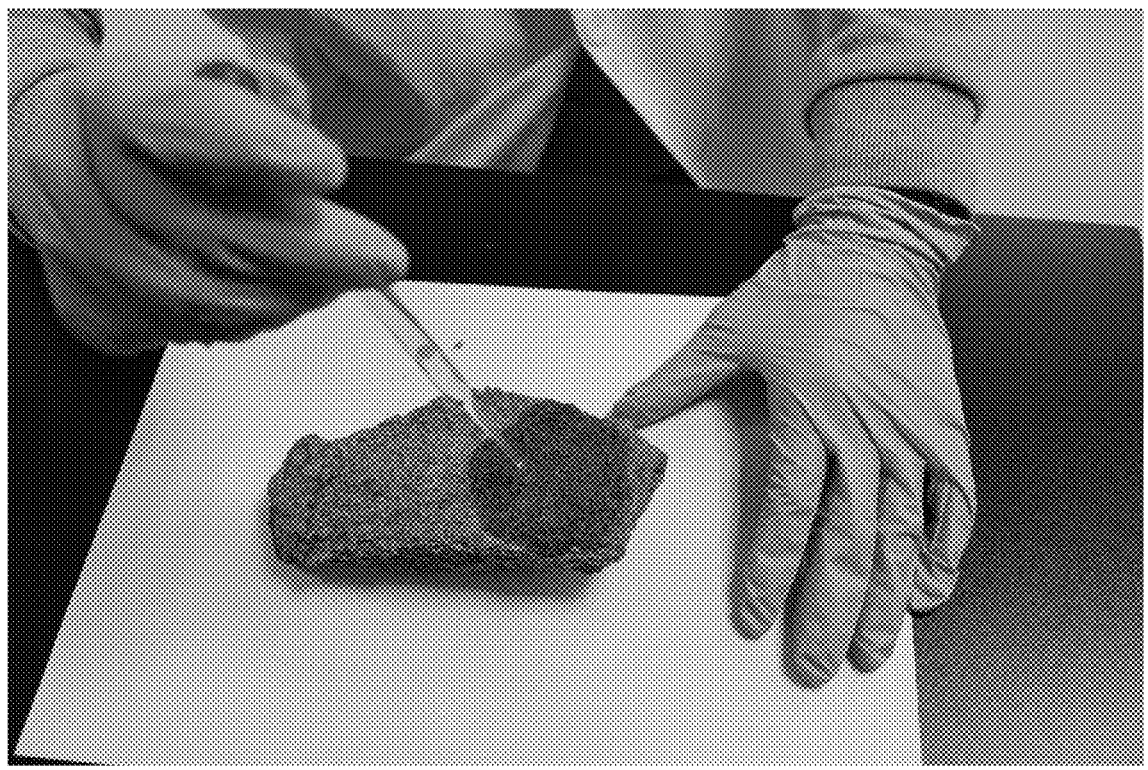
FIG. 2 is the first schematic diagram of adding reinforcement agent.
Figure 3:
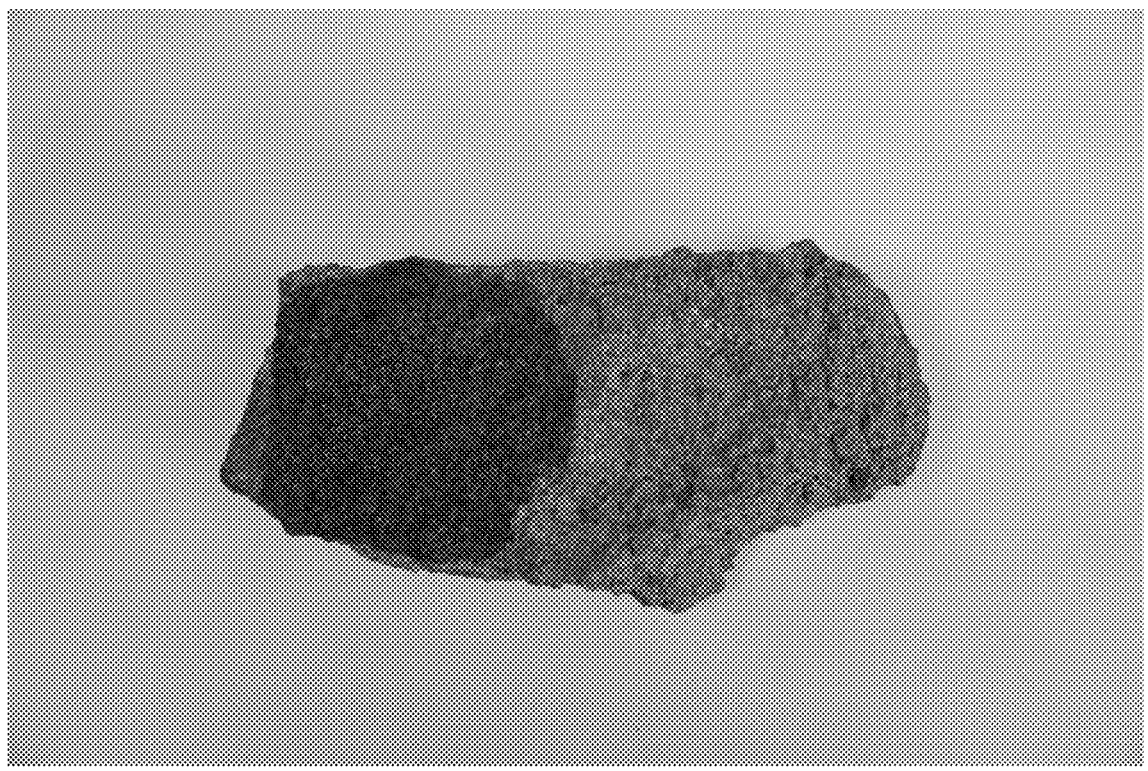
FIG. 3 is the second schematic diagram of adding reinforcement agent.
Figure 4:
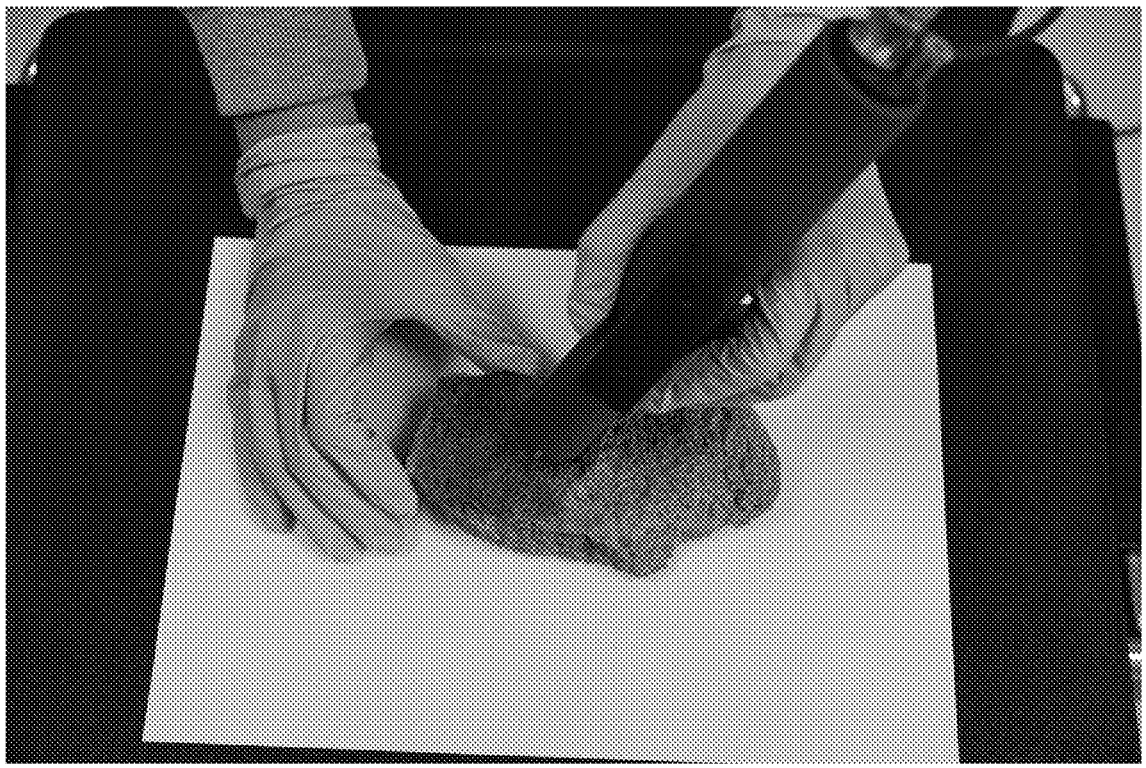
FIG. 4 is the first schematic diagram of low temperature plasma source treatment.
Figure 5:
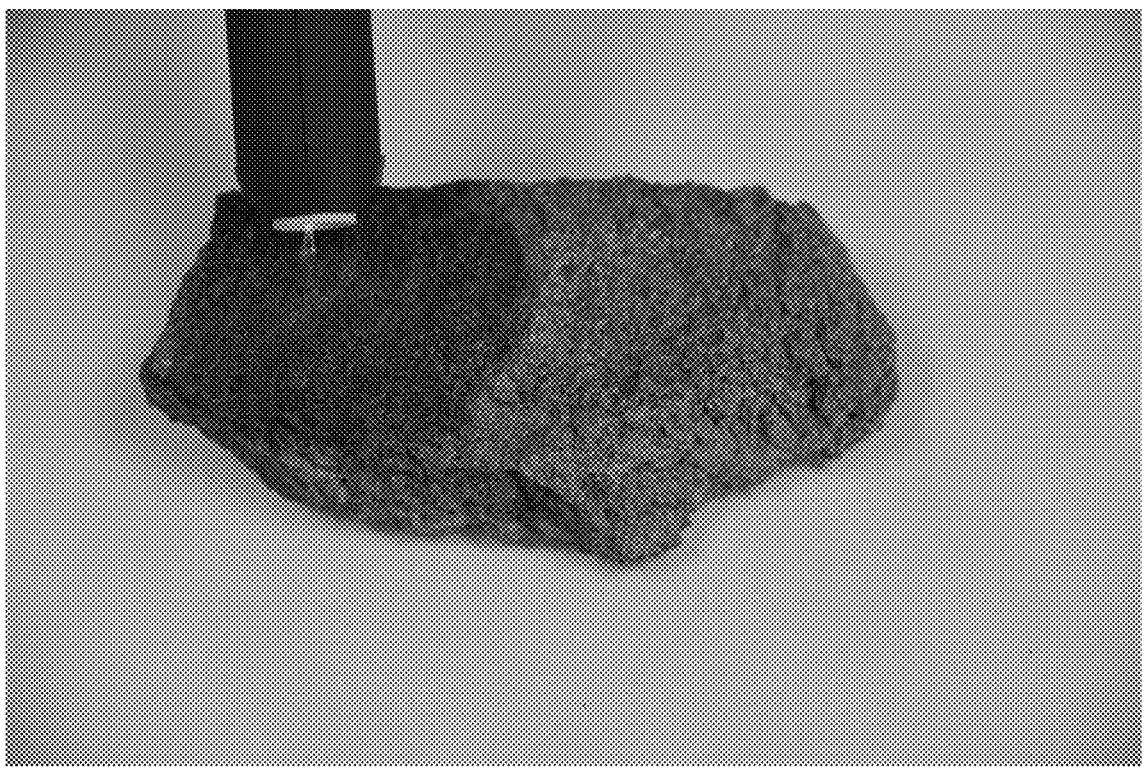
FIG. 5 is the second schematic diagram of low temperature plasma source treatment.
Figure 6:
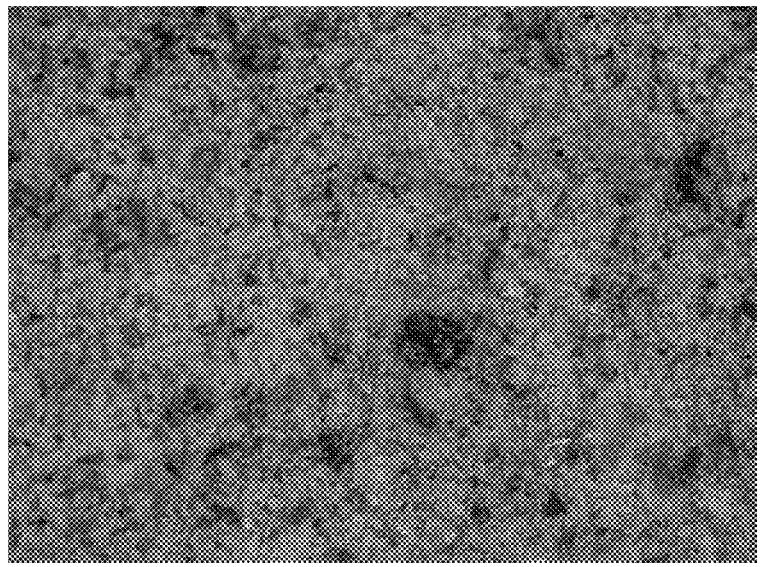
FIG. 6 is an observation view of the surface of the weathered stone relic after removing the surface attachments at a magnification of 1000 times.

Experimental Verification:

A method for reinforcing weathered stone relics by using low temperature plasma to activate calcium hydroxide in carbon dioxide atmosphere, comprising the following steps:

(1) removing the attachments on the surface of stone relics; the surface of weathered stone relics was observed at a magnification of 1000 times, and the specific observation image was shown in FIG. 6;

(2) dispersing calcium hydroxide in an isopropanol aqueous solution with a volume concentration of about 5% to obtain a saturated solution, wherein the calcium hydroxide has a particle size of lower than about 6.5 μm;

(3) spraying the reinforcement agent obtained in step (2) on the weathered layer of the stone relics, as shown in FIGS. 2 and 3, wherein the reinforcement agent was dropwise added by a dropper due to the small surface of the stone relic used in experimental verification;

(4) spraying the stone relics sprayed with reinforcement agent obtained in step (3) for 1 min by using the nozzle of a low temperature plasma source loaded with carbon dioxide, as shown in FIGS. 4 and 5, wherein the low temperature plasma source has a working voltage of 110 V, a frequency of 50 Hz, and a power of 25 W.

Figure 7:
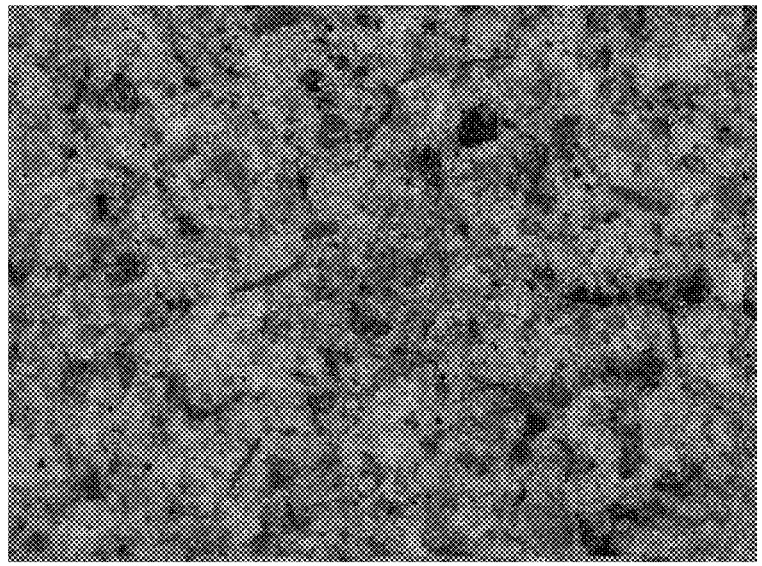
FIG. 7 is an observation view of the surface of the weathered stone relic after being reinforced 5 times at a magnification of 1000 times.
Figure 8:
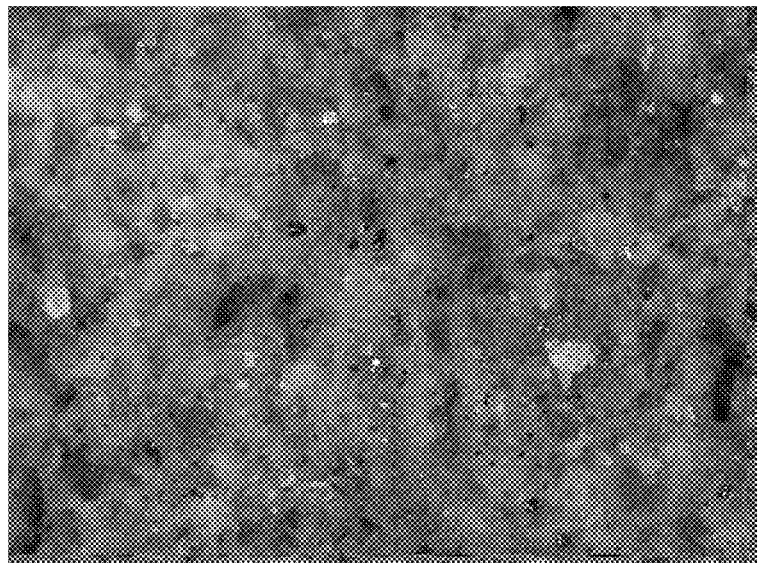
FIG. 8 is an observation view of the surface of the weathered stone relic after being reinforced 10 times at a magnification of 1000 times.
Figure 9:
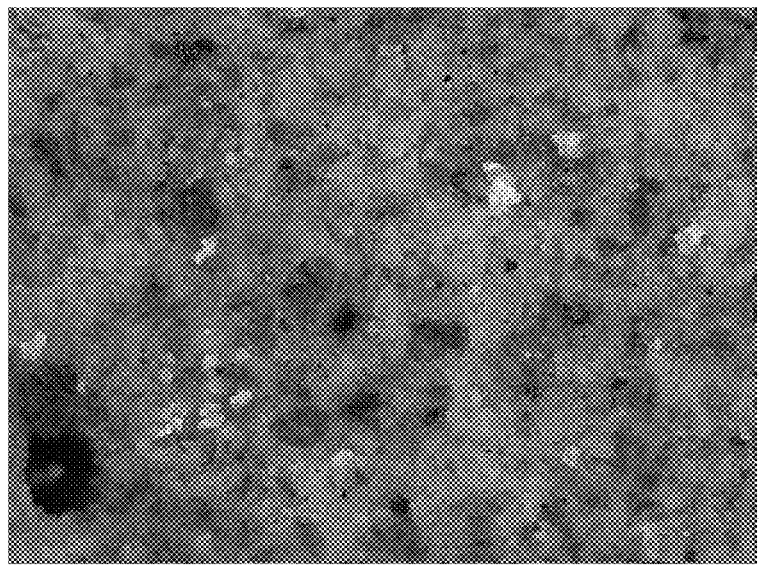
FIG. 9 is an observation view of the surface of the weathered stone relic after being reinforced 15 times at a magnification of 1000 times.

(5) repeating steps (3) and (4), and conducting steps (3) and (4) once means that the reinforcement takes place once; after repeating steps (3) and (4) 5, 10 and 15 times, i.e. after reinforcing stone relics 5, 10 and 15 times, the surface of the stone relics was observed at a magnification of 1000 times, and the specific observation images were each shown in FIGS. 7, 8 and 9.

By comparing FIGS. 6, 7, 8 and 9, it can be seen that:

FIG. 6: the stone relic has a surface with disadvantages of serious deterioration, unevenness, and loose particles;

FIG. 7: after the stone relic was reinforced 5 times by the above method, calcium carbonate crystal is formed on the surface of the sample, and the calcium carbonate fills in the gaps between particles, but the crystal is scatteredly distributed, so that the stone has an improved surface roughness;

FIG. 8: after the stone relic was reinforced 10 times by the above method, the calcium carbonate crystal is increased, the filling is more sufficient, and the crystalline layer of calcium carbonate is uniformly distributed, forming an effective reinforcing layer, so that the stone has a significantly improved surface roughness and increased surface strength, while its color is not significantly changed;

FIG. 9: after the stone relic was reinforced 15 times by the above method, the calcium carbonate crystal is increased more, the filling is complete, and the crystalline layer of calcium carbonate is uniformly distributed, forming an effective reinforcing layer, so that the surface of the deteriorated stone is smooth and obviously strengthened, while its color becomes slightly white.

The above are only the preferred embodiments of the present invention. It should be noted that for those skilled in the art, several changes and improvements can be made without departing from the overall concept of the present invention. These should also be regarded as the protection scope of the present invention.

What is claimed is:

1. A method for reinforcing weathered stone relics by using low temperature plasma to activate calcium hydroxide in carbon dioxide atmosphere, comprising the following steps:
    (1) removing attachments on a surface of stone relics;
    (2) dispersing calcium hydroxide in an isopropanol aqueous solution with a volume concentration of about 5%-5.5% to obtain a saturated reinforcement solution, wherein the calcium hydroxide has a particle size of lower than about 6.5 µm;
    (3) spraying the reinforcement solution obtained in step (2) on a weathered layer of the stone relics;
    (4) spraying the stone relics sprayed with reinforcement solution obtained in step (3) with cold plasma with a temperature lower than about 50° C. generated from the nozzle of a low temperature plasma source loaded with carbon dioxide; and
    (5) repeating steps (3) and (4) 10-15 times.

2. The method according to claim 1, wherein in step (4), the low temperature plasma source has a working voltage of 110 V-240 V, a frequency of 50 Hz-60 Hz, and a maximum power of 30 W; conducting steps (3) and (4) once means that the reinforcement takes place once, and the interval between reinforcements is at least 20 minutes.

3. The method according to claim 1, wherein in step (4), the low temperature plasma source has a standard treating distance of about 2 mm-10 mm, and a standard treating width of about 5 mm-20 mm.

4. The method according to claim 1, wherein in step (4), the site sprayed with the reinforcement solution on the stone relics is scanned for 1 min-2 min by using a plasma flame at a nozzle of the low temperature plasma.

5. The method according to claim 1, wherein in step (2), the method for preparing the reinforcement solution comprises: dispersing nano calcium hydroxide or the calcium hydroxide with a particle size of lower than or equal to 6.5 µm in an isopropanol aqueous solution with a volume concentration of about 5%-5.5%, then stirring the system for 2 h-3 h with a stirrer or concussing the system for 2 h-3 h with ultrasonic waves to obtain a saturated solution.

* * * * *